United States Patent [19]

Heightley

[11] 3,769,499

[45] Oct. 30, 1973

[54] THRESHOLD LOGIC THREE-INPUT ADDER

[75] Inventor: John Donnell Heightley, Basking Ridge, N.J.

[73] Assignee: Bell Telephone Laboratories, Incorporated, Murray Hill, N.J.

[22] Filed: Apr. 4, 1972

[21] Appl. No.: 240,954

[52] U.S. Cl. .................. 235/172, 235/176, 307/211

[51] Int. Cl. .......................... G06f 7/50, G06f 7/385

[58] Field of Search .................... 235/172, 176, 168; 307/211

[56] References Cited

UNITED STATES PATENTS

| | | | |
|---|---|---|---|
| 3,586,845 | 6/1971 | Komamiya et al. | 235/172 |
| 3,248,529 | 4/1966 | Buelow et al. | 235/172 |
| 3,609,329 | 9/1971 | Martin | 235/172 X |
| 3,628,000 | 12/1971 | Weis | 235/176 |

*Primary Examiner*—Malcolm A. Morrison
*Assistant Examiner*—James F. Gottman
*Attorney*—W. L. Keefauver

[57] ABSTRACT

The invention is a threshold logic three-input adder circuit comprising a combination of storage-processor elements. These elements are each arranged to decide which one of a pair of double-rail input signals has a higher potential and to store the result of that decision. Information stored in each element directs a unit of current through one or the other of two busses for summation and determination of the potentials of the busses. Current steering circuits responsive to the potential on a first one of the busses steer four, two, or no units of current through a second one of the busses. Carry and sum elements compare the potentials of the first and second busses with predetermined reference potentials to determine whether to store "ls" or "Os" resulting from the summation of the input signals.

10 Claims, 4 Drawing Figures

THRESHOLD LOGIC THREE-INPUT ADDER

BACKGROUND OF THE INVENTION

The invention is an adder circuit that is more particularly described as a three-input serial adder circuit using threshold logic.

In the prior art, three binary numbers, or addends, are summed together by means of a pair of threshold-logic two-input serial adder circuits arranged so that the sum output of one adder is applied as an input to the other adder. See, for example, copending U.S. Pat. applications, Ser. Nos. 120,834 (now U.S. Pat. No. 3,720,821) and 120,829, filed Mar. 4, 1971, by the same inventor named in this application.

The prior art arrangement requires a partial-sum-word to be generated from bits of two of the three original input-words and a final-sum-word to be generated subsequently from the bits of the partial-sum-word and the bits of the remaining original input-word. In accordance with conventional mathematical practice, the partial and final summations result from operations on bits in positions having the same significance in the different input-words. Each bit of the partial-sum-word is described by a sum-bit having the same significance as the input-bits being added and by a carry-bit which is retained for summation with input-bits in the position of next higher significance in the same words. The final-sum-word is described by a combination of bits including a sum-bit having the same significance as the input-bits being added, the first carry-bit, and a second carry-bit produced during the final summation process and also retained for summation with input-bits in the position of next higher significance.

It can be shown that the previously described partial summation step does not add any information to the original set of information applied to the adder and therefore is not an essential step in the process of determining the final sum. Also, it can be shown that generation of the partial sum requires some circuit elements which would be unnecessary if the step of generating the partial sum is eliminated.

It is proposed to directly generate the final sum-bit and the first and second carry-bits from information included in the three input-bits and the first and second carry-bits retained from the results of a summation of bits in the position of next lower significance. The final sum-bit, of course, is a bit of an output word of the adder. The first and second carry-bits are retained in the adder for one clock cycle until they are summed with bits in the position of next higher significance in the same words.

Therefore, it is an object of the invention to produce a final sum of three binary input-words, or addends, without undertaking an intermediate partial summation.

SUMMARY OF THE INVENTION

This and other objects of the invention are realized in an illustrative embodiment thereof in which the circuit converts each of five information bits into a unit of current conducted alternatively through either a first or a second bus and produces predetermined potentials thereon. Current steering circuits responsive to the potential on the first bus selectively steer four units, two units, or no units of current to the second bus. An output circuit is constrained to one or the other of two states in response to the level of the prdetermined potential on the second bus as compared with a reference potential.

A feature of the invention is an arrangement that combines six storage-processor elements into a threshold logic three-input adder circuit.

Another feature is a combination of steering circuits which are responsive to various potential levels on the first bus for selectively steering four units, two units, or no units of current through the second bus.

A further feature is a threshold logic adder circuit directly producing final sum and carry-bits from three input-bits having positions of the same significance in different addend-words and their associated carry-bits retained from a summation of bits having a position of next lower significance in the addend-words.

BRIEF DESCRIPTION OF THE DRAWING

A better understanding of the invention may be derived from the detailed description following if that description is considered with respect to the attached drawing in which.

DETAILED DESCRIPTION

Figure 1:
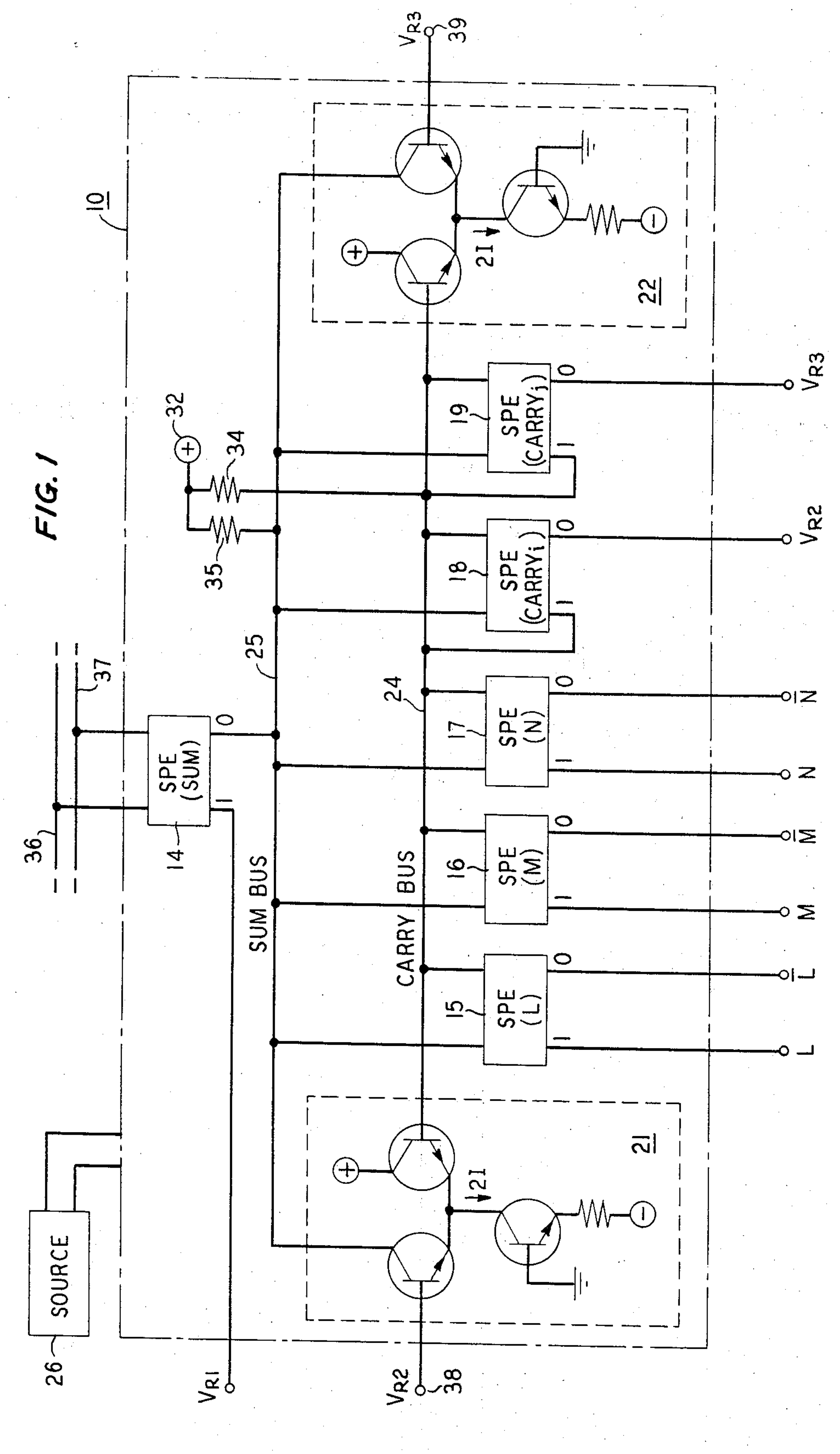
FIG. 1 is a block diagram of a threshold logic three-input adder circuit in accordance with the invention.

Referring now to FIG. 1, there is shown a block diagram comprising six storage-processor elements (SPE) arranged as a threshold logic three-input adder circuit 10. Included in the adder circuit are storage-processor elements 14, 15, 16, 17, 18, and 19; a pair of steering circuits 21 and 22; a first bus 24; and a second bus 25. The storage-processor elements included in FIG. 1 are similar to the storage-processor elements described in the aforementioned U. S. Pat. No. 3,720,821. As explained in that patent application, operation of these elements is controlled by a source of bias 26 which supplies a pair of complementary periodic control signals 27 and 28, shown in FIG. 2 herein.

The control signals 27 and 28 are applied concurrently by source 26 to all of the storage-processor elements of FIG. 1. Although the leads from source 26 actually extend to all of the storage-processor elements of the adder 10, illustratively those leads are terminated at the outline of block 10 in order to simplify the diagram. The arrangement for connecting the source 26 with individual storage-processor elements is shown in detail in the aforementioned U. S. Pat. No. 3,720,821.

Figure 3:
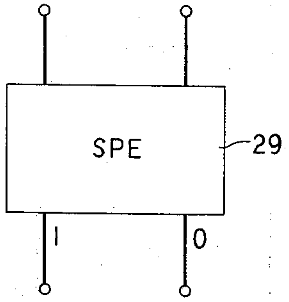
FIG. 3 shows a circuit symbol used in the block diagrams of FIGS. 1 and 4.

Referring now to FIG. 3, there is shown a symbolic storage-processor element 29 representing the storage-processor element, described in the aforementioned U. S. Pat. No. 3,720,821, and used in the block diagrams of FIGS. 1 and 4 herein. Because control signal leads are omitted from the interior of block 10 in FIG. 1, only information input and output terminals of the symbolic element 29 are shown in FIG. 3. Double-rail input terminals are located at the bottom of the symbol, and double-rail output terminals are located at the top.

A conventional notation convention is used for describing operation of the symbolic element 29. This notation will be described for the moment without consideration of timing in accordance with the control signals of FIG. 2. In this convention, a 1 is to be written into the element 29 when the potential being applied to the left-hand input 1 is higher than the potential applied to the right-hand input 0. Thereafter while the 1 is stored in the element, a unit of current is directed into the left-hand output terminal. Conversely, a 0 is written into the element when the 0 input is higher than the 1 input. A unit of current thereafter will be directed into the right-hand output terminal. Thus, in this convention, the input and output 1 terminals are to the left and the 0 terminals are to the right, as shown just below the block.

Figure 4:
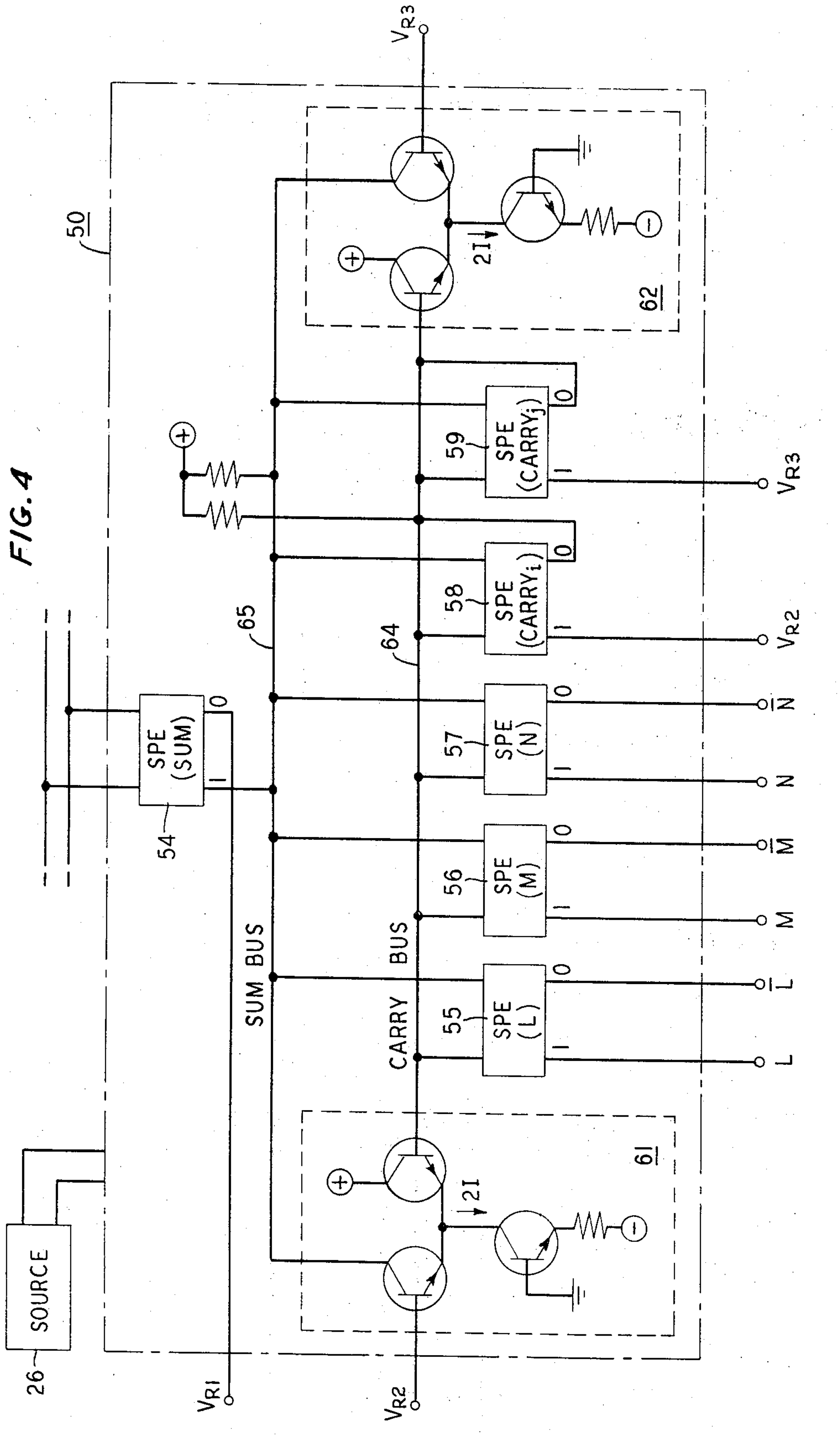
FIG. 4 shows an alternative embodiment of the invention.

As previously indicated, the element 29 of FIG. 3 can be interconnected in groups forming threshold logic circuits, such as those shown in FIGS. 1 and 4. The diagrams of FIGS. 1 and 4 each include two threshold logic circuits. One threshold logic function is processed on the first, or carry, bus and the other on the second, or sum, bus.

Addition processes proceed by starting with a summation of the least significant bits of the three input-words, or addends, during a first clock cycle. At that time, the sum element 14 and the carry elements 18 and 19 are clear; and first (L), second (M), and third (N) input-bits representing new digits to be summed are stored respectively in the elements 15, 16, and 17. The stored input-bits L, M, and N control units of current conducted through one or the other of the output terminals of the respective elements.

Figure 2:
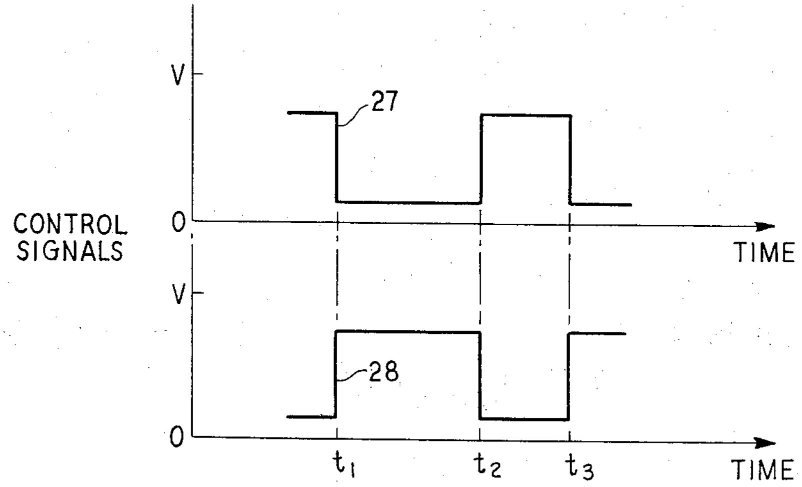
FIG. 2 shows typical waveforms used for operating the circuit of FIG. 1.

These units of current establish a potential level on the carry bus 24 and on the sum bus 25 while the bits are stored between the times $t_1$ and $t_2$ of the clock cycle of FIG. 2. Power supply 32 delivers these units of current through a resistor 34 to the carry bus and through a resistor 35 to the sum bus.

A voltage drop related to the number of units of current conducted through the resistor 34 determines the potential on the bus 24 with respect to a fixed potential of the source 32.

Steering circuits 21 and 22 are responsive to the potential thus produced on the carry bus for steering four, two, or no units of current through the sum bus.

A voltage drop related to the total number of units of current conducted through the resistor 35 determines the potential on the bus 25 with respect to the potential of source 32.

Carry and sum bits are determined and written into the elements 18 and 14, respectively, between the times $t_2$ and $t_3$ of the clock cycle shown in FIG. 2. When the bias control signals of FIG. 2 change at time $t_2$, the potentials representing the carry and sum information on the busses 24 and 25 are coupled to inputs of flip-flops included within the elements 18 and 14. Those flip-flops receive the potentials; compare them with reference potentials $V_{R2}$ and $V_{R1}$; and are constrained to one of two bistable states by the time $t_3$. The state of the elements 18 and 14 after time $t_3$ represents the carry and sum bits. These bits are manifested by units of current conducted through outputs of those elements during the next clock cycle.

While the sum and carry bits are being determined and stored between times $t_2$ and $t_3$ of the first clock cycle, three new input-bits L, M, and N from the next more significant positions of the three input-words are stored in the elements 15, 16, and 17.

In the second clock cycle, the first carry-bit produced and written into element 18 during the first clock cycle is added together with the three new input-bits L, M, and N. This addition produces another sum-bit to be written into element 14, another first carry-bit to be written into element 18, and a second carry-bit to be written into element 19.

These sum and carry bits are all determined and written between the times $t_2$ and $t_3$ of the second clock cycle. Concurrently between the times $t_2$ and $t_3$ of the second clock cycle, three more new input-bits L, M, N, having the next more significant position in the input-words, are written into the elements 15, 16, and 17.

During a third clock cycle, the first and second carry-bits are added together with the three new input-bits of the input-words. This addition in the third clock cycle again produces a sum-bit and first and second carry-bits which are written respectively into the elements 14, 18, and 19 between the times $t_2$ and $t_3$ of the third clock cycle.

This process of the third clock cycle is repeated again and again in subsequent clock cycles until all of the bits of the three input-words are summed.

The sum-bit S, first carry-bit $C_{i+1}$, and second carry-bit $C_{j+1}$, to be stored respectively in the elements 14, 18, and 19, are generated in accordance with the logic of binary arithmetic. TABLE I following is a truth table for such logic.

TABLE I

| INPUTS | | | | | OUTPUTS | | |
|---|---|---|---|---|---|---|---|
| L | M | N | $C_i$ | $C_j$ | $C_{i+1}$ | $C_{j+1}$ | S |
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 0 | 1 |
| 0 | 1 | 0 | 0 | 0 | 0 | 0 | 1 |
| 1 | 0 | 0 | 0 | 0 | 0 | 0 | 1 |
| 0 | 0 | 1 | 1 | 0 | 1 | 0 | 0 |
| 0 | 1 | 0 | 1 | 0 | 1 | 0 | 0 |
| 1 | 0 | 0 | 1 | 0 | 1 | 0 | 0 |
| 0 | 1 | 1 | 0 | 0 | 1 | 0 | 0 |
| 1 | 0 | 1 | 0 | 0 | 1 | 0 | 0 |
| 1 | 1 | 0 | 0 | 0 | 1 | 0 | 0 |
| 0 | 1 | 1 | 1 | 0 | 1 | 0 | 1 |
| 1 | 0 | 1 | 1 | 0 | 1 | 0 | 1 |
| 1 | 1 | 0 | 1 | 0 | 1 | 0 | 1 |
| 1 | 1 | 1 | 0 | 0 | 1 | 0 | 1 |
| 1 | 1 | 1 | 1 | 0 | 1 | 1 | 0 |
| 0 | 0 | 0 | 1 | 1 | 1 | 0 | 0 |
| 0 | 0 | 1 | 1 | 1 | 1 | 0 | 1 |
| 0 | 1 | 0 | 1 | 1 | 1 | 0 | 1 |
| 1 | 0 | 0 | 1 | 1 | 1 | 0 | 1 |
| 0 | 1 | 1 | 1 | 1 | 1 | 1 | 0 |
| 1 | 0 | 1 | 1 | 1 | 1 | 1 | 0 |
| 1 | 1 | 0 | 1 | 1 | 1 | 1 | 0 |
| 1 | 1 | 1 | 1 | 1 | 1 | 1 | 1 |

In TABLE I the variables L, M, and N are input-bits stored in the elements 15, 16, and 17 between the times $t_1$ and $t_2$ for any clock cycle. Variables $C_i$, $C_j$ are the carry-bits stored respectively in the elements 18 and 19 between the times $t_1$ and $t_2$ of any clock cycle and generated during the previous clock cycle by the summation of bits having a position of next lower significance. The variables $C_{i+1}$ and $C_{j+1}$, respectively, are the first and second carry-bits and the variable S is the sum-bit, all determined between the times $t_2$ and $t_3$ of any clock cycle as a result of the summation of the variables L, M, N, $C_i$, and $C_j$. The bits $C_{i+1}$ and $C_{j+1}$ are stored between the times $t_1$ and $t_2$ of the subsequent clock cycle and are considered to be the bits $C_i$ and $C_j$ during that subsequent clock cycle.

Analysis of TABLE I will show that the following equations represent threshold logic functions for generating the sum and carry bits in three-input addition.

$$S=\sum_{n=1}^{n=5}X_n+2\overline{C}_{i+1}+2\overline{C}_{j+1} \text{ when } \begin{matrix}\Sigma\leq 4, S=0\\ \Sigma\geq 5, S=1\end{matrix} \quad (1)$$

$$C_{i+1}=\sum_{n=1}^{n=5}\overline{X}_n \text{ when } \begin{matrix}\Sigma\geq 4, C_{i+1}=0\\ \Sigma\leq 3, C_{i+1}=1\end{matrix} \quad (2)$$

$$C_{j+1}=\sum_{n=1}^{n=5}\overline{X}_n \text{ when } \begin{matrix}\Sigma\geq 2, C_{j+1}=0\\ \Sigma\leq 1, C_{j+1}=1\end{matrix} \quad (3)$$

Equations (1), (2), and (3) are implemented by the circuit of FIG. 1. Equation (1) expresses a summation of the units of current conducted in the sum bus. It is represented by the circuit arrangement conducting units of current through the sum bus and including the sum element 14 which determines whether the sum-bit equals 1 or 0. Limits included in the expression of equation (1) represent a threshold related to the number of units of current in the sum bus. Equations (2) and (3) express summations of the units of current conducted in the carry bus. They are represented by the arrangement conducting units of current through the carry bus and including the carry elements 18 and 19 which determine whether or not the carry-bits $C_{i+1}$ and $C_{j+1}$ equal 1 or 0. Limits included in the equations (2) and (3) represent thresholds related to the number of units of current in the carry bus.

To better correlate equation (1) with the circuit of FIG. 1, consider that the variable $X_n$ in equation (1) represents the $n$th input variable of a set of variables $X_1 = L$, $X_2 = M$, $X_3 = N$, $X_4 = C_i$, and $X_5 = C_j$. The variables L, M, N, $C_i$, and $C_j$, of course, are stored concurrently in the elements 15–19 of FIG. 1 and each may equal either 1 or 0. Because the variable $X_n$ is true in equation (1), the 1 output of each of the elements 15–19 is connected to the sum bus. Each element thus directs through the sum bus one unit of current when that element stores a 1 and no current when the element stores a 0. Thus, the sum $$\sum_{n=1}^{n=5}X_n$$

represents the units of currents conducted in the sum bus by the elements 15–19 and may have a value of from zero to five units of current.

Further consider that the variables $\overline{C}_{i+1}$ and $\overline{C}_{j+1}$ in equation (1) represent the complement of carry-bits to be generated by the summation of the variables L, M, N, $C_i$, and $C_j$ stored between the times $t_1$ and $t_2$ of any clock cycle. The variables $\overline{C}_{i+1}$ and $\overline{C}_{j+1}$ are not stored in the elements of circuit 10 between the times $t_1$ and $t_2$ of the same clock cycle, but the steering circuits 21 and 22 are arranged to selectively direct through the sum bus a number of units of current dependent upon the values of the variables $\overline{C}_{i+1}$ and $\overline{C}_{j+1}$ being generated later during that clock cycle.

Because the variables $\overline{C}_{i+1}$ and $\overline{C}_{j+1}$ are false in equation (1), they indicate that units of current are steered by the steering circuits through the sum bus when the respective carries are not to be generated and are not directed through the sum bus when the carries are to be generated.

Each of the variables $\overline{C}_{i+1}$ and $\overline{C}_{j+1}$ is multiplied by two in equation (1) to indicate that these variables have twice the weight of the input variables in the threshold function. The steering circuits 21 and 22 are arranged so that each steers either two units or no units of current through the sum bus depending respectively upon the values of $\overline{C}_{i+1}$ and $\overline{C}_{j+1}$ being generated during the same clock cycle. Total current steered through the sum bus by the steering circuits 21 and 22 between the times $t_1$ and $t_2$ of a cycle will be described more fully hereinafter in a discussion of the generation of the carries $\overline{C}_{i+1}$ and $\overline{C}_{j+1}$.

The total number of units of current directed through the sum bus by the elements 15–19 and by the steering circuits 21 and 22 are conducted through the resistor 35. A resulting voltage drop occurring across the resistor 35, when offset from the potential of supply 32, determines the potential of the sum bus 25. This sum bus potential is applied to the 0 input of the sum element 14 and is compared with a first reference potential $V_{R1}$ being applied to the 1 input of element 14, This first reference potential $V_{R1}$ establishes a threshold level on element 14 so that the element is set to 1 only when at least five units of current are conducted through the resistor 35 and the sum bus 25. Otherwise the element 14 is set to 0.

Referring now to equations (2) and (3), it is noted that the variable $\overline{X}_n$ is merely the complement of the variable $X_n$ in equation (1). Advantageously, the 0 outputs of the elements 15–19 can be connected to the carry bus 24 for generating both carry functions simultaneously with the sum function being generated. Each element directs through the carry bus one unit of current when that element stores a 0 and no current when the element stores a 1. Thus the 1 and 0 outputs of each of the input elements 15–19 are utilized generating different threshold logic functions, one for the sum and the other for the carries. The sum $$\sum_{n=1}^{n=5}\overline{X}_n$$

represents the units of current conducted in the carry bus and may have a value from zero to five units of current.

With respect to the carry bus 24 in FIG. 1, the units of current conducted through the resistor 34 and the carry bus establish on the carry bus a potential determined by the number of units of current. This carry bus potential level is compared with a second reference potential $V_{R2}$ being applied to the 0 input terminal of element 18 and to input terminal 38 of steering circuit 21. This second reference potential establishes a threshold level so that the carry element 18 is set to 1 and so that the steering circuit 21 cuts off two units of current from being conducted through the sum bus 25 when three or less than three units of current are conducted through the resistor 34 and the carry bus. Otherwise, the element 18 is set to 0, and the circuit 21 steers two units of current through the sum bus 25.

The potential on the carry bus 24 also is compared with a third reference potential $V_{R3}$ applied to the 0 input of the carry element 19 and to an input terminal 39 of the steering circuit 22. This third reference potential establishes a threshold level so that the carry element 19 is set to 1 and so that the steering circuit 22 cuts off two units of current from being conducted through the sum bus 25 only when one or no units of current are conducted through the carry bus. Otherwise, the element 19 is set to 0 and the circuit 22 steers two units of current through the sum bus 25.

Thus, when both of the steering circuits 21 and 22 steer two units of current through the sum bus 25, four units of current are steered therethrough by the steering circuits. When steering circuit 21 cuts off two units of current and steering circuit 22 steers two units of current through the sum bus, only two units are steered by the circuits 21 and 22 through the sum bus. When both steering circuits 21 and 22 cut off all of their units of current, no units of current are steered by the steering circuits through the sum bus.

Analysis of TABLE I with respect to the equations (1), (2), and (3) and to the operation of the adder 10 of FIG. 1 will show that the input-bits L, M, and N and the carry-bits $C_i$ and $C_j$ are summed in one cycle of the drive signal shown in FIG. 2. The resulting sum-bit is stored in the element 14 of FIG. 1 by the time $t_3$ of that clock cycle for controlling a unit of current that is conducted through either the bus 36 or the bus 37 for additional processing during the next subsequent cycle of the control signals 27 and 28 of FIG. 2. The resulting carry-bits are stored in the elements 18 and 19 by the time $t_3$, and they control units of current conducted through either the bus 24 or the bus 25 for additional processing during the next subsequent clock cycle. These sum and carry bits stored at the end of each cycle fully describe the result of the summation of the input-bits having positions of the same significance in the three input-words.

Further analysis of TABLE I will disclose that the following equations also represent logic functions for generating the sum and carry bits in three-input addition.

$$S=\sum_{n=1}^{n=5} \overline{X}_n+2C_{i+1}+2C_{j+1} \text{ when } \begin{matrix}\Sigma\leq 4, & S=1\\ \Sigma\geq 5, & S=0\end{matrix} \qquad (4)$$

$$C_{i+1}=\sum_{n=1}^{n=5} X_n \text{ when } \begin{matrix}\Sigma\geq 4, & C_{i+1}=1\\ \Sigma\leq 3, & C_{i+1}=0\end{matrix} \qquad (5)$$

$$C_{j+1}=\sum_{n=1}^{n=5} X_n \text{ when } \begin{matrix}\Sigma\geq 2, & C_{j+1}=1\\ \Sigma\leq 1, & C_{j+1}=0\end{matrix} \qquad (6)$$

It is noted that equations (4), (5) and (6) are similar respectively to the equations (1), (2), and (3) except that all terms are complemented. This means that interconnections between the various circuit elements of FIG. 1 must be inverted.

Referring now to FIG. 4, there is shown a block diagram of an alternative threshold logic three-input adder circuit 50 which implements the functions of equations (4), (5), and (6). The circuit 50 includes six storage-processor elements 54, 55, 56, 57, 58, and 59; a pair of current steering circuits 61 and 62; carry and sum busses 64 and 65; and resistors connecting those busses to a voltage supply.

The circuit arrangement and its operation are very much like the circuit of FIG. 1 except that output connections from the elements 55–59 to the carry and sum busses are taken from output terminals which are the complements of those used in FIG. 1. Additionally, the reference potentials $V_{R1}$, $V_{R2}$, and $V_{R3}$ are applied to input terminals which are the complements of the input terminals used in FIG. 1. As a result of these changes, the threshold levels are altered to operate the circuit as follows.

In the circuit of FIG. 4, the first reference potential $V_{R1}$ establishes a threshold level so that the sum element 54 is set to 1 when four or less than four units of current are conducted through the sum bus 65. Otherwise the element 54 is set to 0.

The second reference potential $V_{R2}$ establishes a threshold level so that the carry element 58 is set to 1 and so that the steering circuit 61 steers two units of current through the sum bus 65 only when at least four units of current are conducted through the carry bus 64. Otherwise the element 58 is set to 0 and the circuit 61 steers no current through the sum bus 65.

The third reference potential $V_{R3}$ establishes a threshold level so that the carry element 59 is set to 1 and so that the steering circuit 62 steers two units of current through the sum bus 65 only when at least two units of current are conducted through the carry bus 64. Otherwise the element 59 is set to 0 and the circuit 62 steers no current through the sum bus 65.

As previously mentioned the circuit of FIG. 4 implements the threshold functions represented by equations (4), (5), and (6) and operates cyclically like the circuit of FIG. 1 in response to the bias control signals 27 and 28 of FIG. 2.

Thus, in operation, the steering circuits 61 and 62 of FIG. 4 can steer either four, two, or no units of current through the sum bus at any time depending upon the input information stored in the elements 55–59. This is analogous to the operation described for the embodiment of FIG. 1.

Sum and carry bits stored at the end of each cycle fully described the result of the summation of the input-bits having positions of the same significance in the three input-words, or addends.

The above detailed description is illustrative of two embodiments of a threshold logic three-input adder. It is understood that additional embodiments thereof will be obvious to those skilled in the art. The embodiments described herein together with those additional embodiments are considered to be within the scope of the invention.

What is claimed is:

1. A threshold logic adder circuit comprising first and second busses;

means for converting each of five information bits into a unit of current conducted alternatively through the first or the second bus;

means responsive to current in the first and second busses for producing potentials thereon;

means responsive to the potential on the first bus for steering selectively four units, two units, or no units of current through the second bus; and means for comparing the potential on the second bus with a reference potential.

2. An adder circuit in accordance with claim 1 wherein the comparing means includes a bistable circuit being constrained to a first stable state when at least five units of current are conducted in the second bus and being constrained to a second state when less than five units of current are conducted in the second bus.

3. An adder circuit in accordance with claim 2 wherein the means selectively steering current includes first and second current steering circuits;

the first steering circuit steers two units of current through the second bus only when at least four units of current are conducted in the first bus; and the second steering circuit steers two units of current through the second bus only when at least two units of current are conducted in the first bus.

4. An adder circuit in accordance with claim 3 wherein the converting means include five separate storage-processor elements having complementary outputs connected respectively to the first and second busses; and the comparing means comprises a further storage-processor element having a first input connected to the second bus and a reference potential applied to a second input.

5. An adder circuit in accordance with claim 1 wherein control means apply a pair of complementary drive signals to all of the storage-processor elements for synchronizing operation of the elements.

6. A threshold logic adder comprising carry and sum busses;

storage-processor means for storing three addend-word bits and two carry-bits and for selectively directing five units of current through the carry bus or through the sum bus depending upon the values of the addendword bits and the carry-bits;

means responsive to current conducted in the carry and sum busses for producing potentials thereon;

a first steering circuit responsive to the potential on the carry bus and to a reference potential for steering two units of current through the sum bus only when at least four units of current are conducted in the carry bus;

a second steering circuit responsive to the potential on the carry bus and to another reference potential for steering two units of current through the sum bus only when at least two units of current are conducted in the carry bus; and a sum storage-processor element responsive to the potential on the sum bus and to a predetermined reference potential is constrained to a first stable state when at least five units of current are conducted in the sum bus and is constrained to a second stable state when less than five units of current are conducted in the sum bus.

7. An adder in accordance with claim 6 wherein a first storage-processor element for storing one of the two carry-bits responds to the potential on the carry bus and to a reference potential, is constrained to a first stable state when at least four units of current are conducted in the carry bus, and is constrained to a second stable state when less than four units of current are conducted in the carry bus; and a second storage-processor element for storing one of the two carry-bits responds to the potential on the carry bus and to a reference potential, is constrained to a first stable state when at least two units of current are conducted in the carry bus, and is constrained to a second stable state when less than two units of current are conducted in the carry bus.

8. An adder in accordance with claim 7 wherein control means apply a pair of complementary drive signals to all of the storage-processor means for synchronizing their operation.

9. The method of forming the sum of bits of three input-words by the threshold logic steps of a. writing a bit of each word in separate storage-processor elements;
b. concurrently writing one or two carry-bits in additional separate storage-processor elements;
c. directing a unit of current through each of the storage-processor elements alternatively to carry and sum busses;
d. determining a selected potential on the carry bus in response to the number of units of current conducted therethrough;
e. steering selectively four, two, or no units of additional current through the sum bus in response to the potential on the carry bus;
f. determining a selected potential on the sum bus in response to the number of units of current conducted therethrough;
g. comparing the potentials on the carry and sum busses with predetermined reference potentials; and
h. constraining carry and sum storage-processor elements to one or the other of two stable states in response to the comparison of the potentials on the carry and sum busses with the predetermined reference potentials.

10. An *m* input, where m is greater than 2, threshold logic adder comprising carry and sum busses;

means for storing *m* input-bits, each from a corresponding order of *m* addend-words;

means for storing $m-1$ carry-bits, each generated by a summation of bits of a next lower order of significance in the addend-words;

the $2m-1$ storing means being arranged for directing units of current through the carry and sum busses alternatively, depending upon the value of the bits stored;

means for writing $m-1$ new carry-bits in the carry-bit storing means, each new carry-bit being related to a different number of units of current conducted through the carry bus;

means responsive to the number of units of current conducted through the carry bus for selectively steering a different number of units of current through the sum bus for every new carry-bit to be written; and means for storing a sum-bit simultaneously with the storing of the $m-1$ new carry-bits, the sum-bit being related to a predetermined number of units of current conducted through the sum bus.

* * * * *